United States Patent [19]

Ying et al.

[11] Patent Number: 4,900,964

[45] Date of Patent: Feb. 13, 1990

[54] POLE FACE SLOT FILLER

[75] Inventors: Sui-Chun Ying, Winter Springs; Robert T. Hagaman, Oviedo, both of Fla.

[73] Assignee: Westinghouse Electric Corp., Pittsburgh, Pa.

[21] Appl. No.: 295,699

[22] Filed: Jan. 11, 1989

[51] Int. Cl.$^4$ .............................................. H02K 3/34
[52] U.S. Cl. ..................................... 310/215; 310/61; 310/214; 310/261
[58] Field of Search .................. 310/214, 215, 61, 42, 310/51, 179, 262, 261; 336/196, 197

[56] References Cited

U.S. PATENT DOCUMENTS

| | | | |
|---|---|---|---|
| 2,565,530 | 8/1951 | Smith | 171/252 |
| 3,745,394 | 7/1973 | Mason | 310/215 |
| 3,943,392 | 3/1976 | Keuper et al. | 310/215 |
| 4,560,896 | 12/1985 | Vogt et al. | 310/215 |
| 4,633,116 | 12/1986 | Derderian | 310/214 |

FOREIGN PATENT DOCUMENTS

| | | | |
|---|---|---|---|
| 0615090 | 5/1935 | Fed. Rep. of Germany | 310/61 |
| 0536738 | 5/1941 | Fed. Rep. of Germany | 310/262 |
| 1052544 | 3/1959 | Fed. Rep. of Germany | 310/61 |
| 2741362 | 12/1978 | Fed. Rep. of Germany | 310/214 |

*Primary Examiner*—R. Skudy
*Attorney, Agent, or Firm*—M. G. Panian

[57] ABSTRACT

A pole face slot filler (26,28) for insertion into a pole face slot formed in a pole region (18) of a generator rotor, the filler (26,28) having a U-shaped cross section and being composed of a base portion (36) and two leg portions (38) extending from the base portion (36) and forming the legs of the U-shaped cross section, wherein the filler (26,28) is configured and dimensioned to achieve a press fit in the pole face slot.

8 Claims, 1 Drawing Sheet

POLE FACE SLOT FILLER

BACKGROUND OF THE INVENTION

The present invention relates to pole face slot fillers which are installed in slots formed in the pole faces of generator rotors.

The outer surface of a generator rotor is generally divided, in the circumferential direction, between winding regions and pole regions. Each winding region is provided with a plurality of axially extending slots, separated by teeth, the slots containing conductors which are connected at their ends to form the rotor winding.

Because of the presence of slots in the winding regions, the effective density of the rotor is greater in the pole regions than in the winding regions, causing the rotor to have different stiffness, i.e., different moments of inertia about various axes perpendicular to the axis of rotation, which leads to double frequency vibrations. Moreover, because of the above-described circumferential density variation, the rotor will tend to be deformed into an elliptical shape due to centrifugal forces.

In order to minimize these effects, it is known to provide the pole regions of such a rotor with slots generally similar to those provided in the winding regions. When this done, the pole region slots must be provided with slot fillers of a material suitable to provide the necessary magnetic flux paths in each pole region. The pole face slot fillers are held in place by wedges, which can be similar to the wedges used to retain the conductors installed in the winding region slots.

Since the pole face slot fillers increase the effective density of the pole regions, causing the rotor to have different stiffness, or different moments of inertia about various axes, these fillers are usually given a relatively short axial length so as not to affect stiffness and each pole face slot is usually provided with a plurality of such fillers, spaced apart in the axial direction of the rotor, and each pole face slot filler is generally provided with a cutout which can additionally serve as a vent passage for a radially ventilated rotor.

Because such pole face slot fillers have relatively short lengths, they have a tendency to rattle, thereby producing undesired vibrations. In addition, the pole face slot fillers tend to migrate axially when the generator is started up or stopped.

SUMMARY OF THE INVENTION

It is an object of the present invention to provide pole face slot fillers which avoid the disadvantages described above.

A more specific object of the invention is to provide pole face slot fillers which, while remaining structurally simple, will show no tendency to rattle or migrate axially.

The above and other objects according to the present invention are achieved by a pole face slot filler for insertion into a pole face slot formed in a pole region of a generator rotor, the filler having a U-shaped cross section and being composed of a base portion and two leg portions extending from the base portion and forming the legs of the U-shaped cross section, wherein the filler is configured and dimensioned to achieve a press fit in the pole face slot.

DESCRIPTION OF THE PREFERRED EMBODIMENTS

Figure 1:
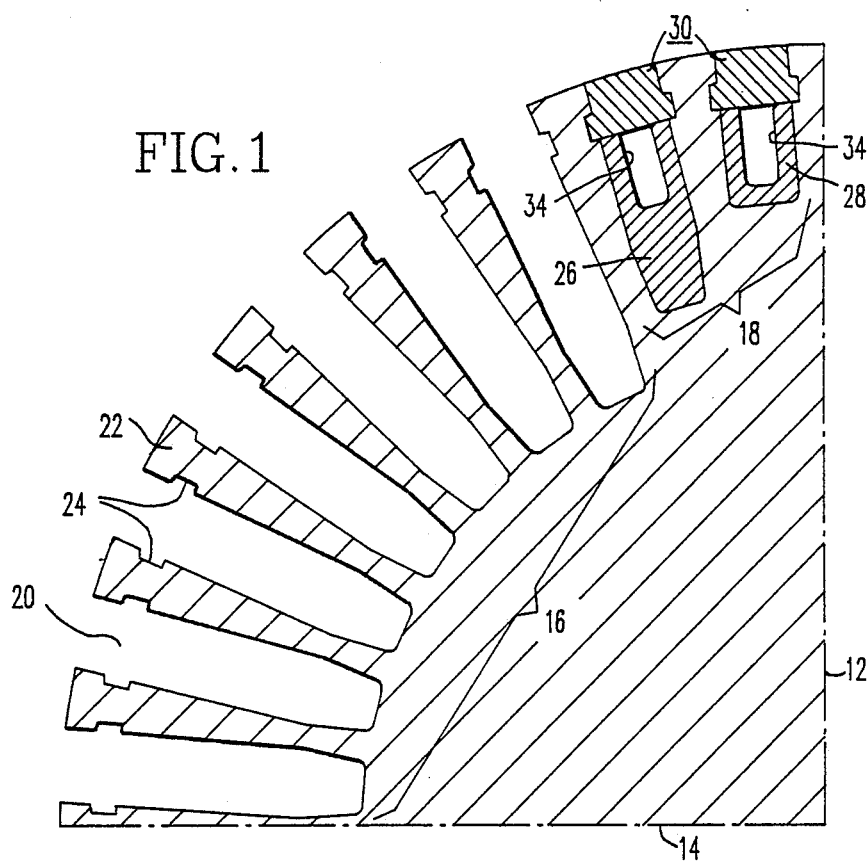
FIG. 1 is a cross-sectional view of a portion of a generator rotor provided with pole face slots and pole face slot fillers which can be constructed according to the present invention.

FIG. 1 shows one-fourth of a generator rotor, bounded by a pole axis 12 and a quadrature axis 14, containing one-half of a winding region 16 and one-half of a pole region 18.

Region 16 contains conventional winding slots 20 separated by teeth 22. Each tooth 22 is formed with recesses 24 for holding wedges in the outer ends of slots 20.

Pole region 18 is provided with longitudinal, or axial, pole face slots for the purpose of equalizing the moments of inertia about axes 12 and 14. In accordance with conventional practice in the art, pole face slot fillers 26 and 28 are introduced into the pole face slots to provide the necessary magnetic flux paths. Fillers 26 and 28 are held in place by wedges 30, typically made of copper. Wedges 30 can be identical to those that will be installed at the rotor circumference ends of winding slots 20.

Since the pole regions usually have a greater density than the winding regions, rotors tend to be deformed into an elliptical form during their operation. Reductions can be achieved by providing each pole face slot filler 26, 28 with a cutout, or recess, 34. Recesses 34 additionally serve as vent passages for a radially ventilated rotor. Wedges 30 which serve to retain fillers 26 and 28 in place can also provide electrical damping.

Basically, the pole face slots and their associated fillers 26, 28 are located and dimensioned to equalize the moments of inertia about pole axis 12 and quadrature axis 14. The dimensions of recesses 34 are selected on the basis of the desired reduction in pole centrifugal force and required ventilation cross section.

It is the usual practice to provide a small clearance fit for each filler in its associated pole face slot, a small clearance fit being one in which a clearance of 0.025 - 0.050 mm (0.001 - 0.002 inch) exists between the filler and its associated slot.

Fillers 26 and 28 generally must be of short axial lengths, such lengths should be shorter than the axial lengths of the rotor, in order to not defeat the moment of inertia equalization created by the pole slots. Accordingly, during generator operation, known fillers tend to rattle and to migrate axially during starting and stopping of the rotor. These movements are undesirable.

According to the invention, these movements are prevented by forming each pole face slot filler 26, 28, which has a U-shaped cross section, so that each filler is dimensioned at its upper edge to achieve a press fit with the associated pole face slot.

Figure 2:
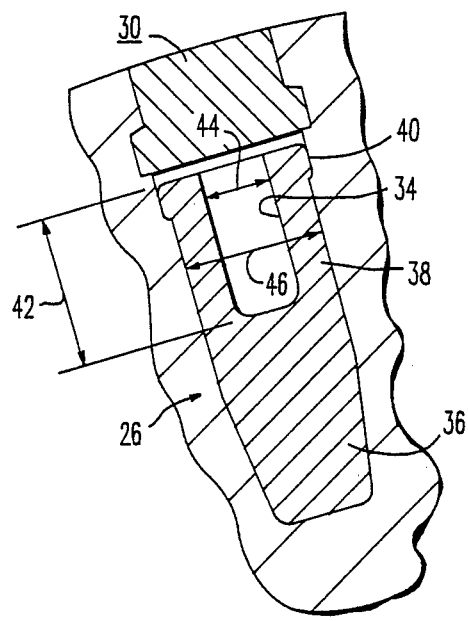
FIG. 2 is a cross-sectional view of one preferred embodiment of a pole face slot filler according to the invention.

An exemplary embodiment is shown in FIG. 2 and corresponds to filler 26 of FIG. 1. The dimensions for filler 26 are chosen according to the considerations described above.

Filler 26 is composed generally of a base portion 36 and two leg portions 38 which extend from base portion 36 in a direction corresponding essentially to a radial direction of the rotor when filler 26 is installed in a pole face slot. According to the invention, filler 26 is provided at its upper edge with outwardly protruding lips, or bosses, 40 dimensioned to create a press fit with the side walls of the associated pole face slot.

A press fit is achieved by giving filler 26 a horizontal dimension, in the plane of FIG. 2, in the region of lips 40 which, before insertion in a pole face slot, exceeds the distance between the walls of the pole face slot by a small amount. Preferably, this dimension is selected so that when filler 26 is installed in a pole face slot, the compression force acting on lips 40 will produce a frictional force between lips 40 and the pole face slot walls, in the radial direction of the rotor, which is at least 10 times the weight of filler 26. A frictional force having this order of magnitude will prevent any rattling or axial migration of filler 26 without interfering with easy installation of filler 26 in the pole face slot.

Preferably, base portion 36 will be dimensioned to achieve a snug fit with a small clearance with its associated portion of the pole face slot.

According to a specific exemplary embodiment of the invention, if filler 26 is to be employed in the rotor of a generator having a rating of several megawatts, filler 26 could have an axial length of the order of 12.7 cm (5"), a cutout height 42 of 3.8 cm (1.5"), cutout width 44 of 1.59 cm (0.625"), an external width 46, in the region of leg portions 38, of 2.855 cm (1.124"), and an external width, at the level of lips 40, of 2.88 cm (1.134"), this dimension being when filler 26 has not yet been inserted in the pole face slot and is therefore undeformed. The pole face slot is formed to have a width which is approximately 0.1 mm (0.004") less than the undeformed external width of filler 26 at the level of lips 40.

With these dimensions, the press fit established between filler 26 and the walls of its associated pole face slot will generate, in the radial direction, a frictional force of the order of 5.37 Kg/cm (30 lb/in) along each slot wall, for a total frictional force of 10.75 Kg/cm (60 lb/in), the length dimensions being parallel to the axis of the rotor.

The base portion 36 of filler 26 can be given a height and cross-sectional configuration corresponding to the height and cross-sectional configuration of the associated pole face slot, which depends on the extent to which the weight of pole region 18 is to be reduced. These dimensions can be selected such that, if filler 26 is made of steel, and the dimensions described above are selected, filler 26 can be given a weight of 0.125 Kg/cm (0.7 lb/in). The weight and friction forces identified above are relative to the axial dimension of filler 26.

Base portion 36, and the corresponding part of the pole face slot, can be tapered, as shown in FIG. 2, although such configuration may make it more difficult to machine the sides of the slot and base portion 36, and to control the required fits. Alternatively, the entire filler, including leg portions 38, can be tapered.

Filler 28 differs from filler 26 only with respect to the size of base portion 36. With regard to the base portion, the dimensions and configurations for each filler are selected so as to not interfere with other components on the rotor.

The number of pole face slots and fillers provided in each pole region is determined according to principles known in the art on the basis of the extent to which the weight of a pole region is to be reduced and the amount of filler material needed to establish the required magnetic flux paths.

Preferably, each filler 26, 28 is given a radial dimension such that when the filler is fully seated in its associated slot, a radial gap of the order of 0.76 mm (0.030 in) exists between the filler and the associated wedge 30. This will facilitate installation of wedge 30, which is generally installed by sliding it axially into the grooves provided therefor in the slot walls. Then, when the assembled rotor is subjected to an overspeed test, fillers 26, 28 will move radially outwardly to press against wedges 30, thereby preventing wedges 30 from rattling or experiencing any axial migration.

While the description above relates to particular embodiments of the present invention, it will be understood that many modifications may be made without departing from the spirit thereof. The pending claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A pole face slot filler for insertion into a pole face slot formed in a pole region of a generator rotor, said filler having a U-shaped cross section and being composed of a base portion and two leg portions extending from said base portion and forming the legs of said U-shaped cross section, said leg portions extending from said base portion in the radial direction away from the axis of the rotor when inserted in the pole face slot, wherein said filler is configured and dimensioned to achieve a press fit in the pole face slot by said leg portions having laterally protruding parts at the ends thereof remote from said base portion.

2. A filler as defined in claim 1 wherein the pole face slot has mutually opposed side walls extending in the axial and radial directions of the rotor, and said filler is dimensioned, in the region of said laterally protruding parts, to establish with the slot side walls a frictional retaining force equal to at least ten times the weight of said filler.

3. A filler as defined in claim 1 wherein the pole face slot has mutually opposed side walls extending in the axial and radial directions of the rotor, and said filler is configured such that prior to insertion of said filler in the slot, the dimension of said filler in the region of said laterally protruding parts exceeds the spacing between the slot side walls by approximately 0.1 mm.

4. A filler as defined in claim 1 having a length, in the axial direction of the rotor, which is substantially shorter than the axial dimension of the rotor.

5. In combination with a generator rotor having a pole region provided with a pole face slot, a pole face slot filler having a U-shaped cross section and being composed of a base portion and two leg portions extending from said base portion and forming the legs of said U-shaped cross section, said leg extending from said base portion in the radial direction away from the axis of the rotor, and said leg portions having laterally protruding parts at the ends thereof remote from said base portion to achieve a press fit in the pole face slot.

6. The combination defined in claim 5 wherein said filler has a length, in the axial direction of said rotor, which is substantially shorter than the axial dimension of said rotor.

7. The combination defined in claim 6 wherein there is a plurality of said fillers installed in said pole face slot.

8. The combination defined in claim 7 further comprising a wedge disposed in said pole face slot radially outward of said fillers with respect to the axis of said rotor.

* * * * *